US008868548B2

(12) United States Patent
Kurzion

(10) Patent No.: US 8,868,548 B2
(45) Date of Patent: Oct. 21, 2014

(54) DETERMINING USER INTENT FROM QUERY PATTERNS

(75) Inventor: Yair Kurzion, Mountain View, CA (US)

(73) Assignee: Google Inc., Mountain View, CA (US)

( * ) Notice: Subject to any disclaimer, the term of this patent is extended or adjusted under 35 U.S.C. 154(b) by 555 days.

(21) Appl. No.: 12/841,299

(22) Filed: Jul. 22, 2010

(65) Prior Publication Data

US 2014/0149399 A1    May 29, 2014

(51) Int. Cl.
*G06F 17/00* (2006.01)

(52) U.S. Cl.
USPC ........................................... 707/723

(58) Field of Classification Search
USPC ............. 707/723, 759, 765, 766, 767, 768, 707/999.005
See application file for complete search history.

(56) References Cited

U.S. PATENT DOCUMENTS

| 6,014,665 | A | 1/2000 | Culliss | |
|---|---|---|---|---|
| 6,078,916 | A | 6/2000 | Culliss | |
| 6,182,068 | B1 | 1/2001 | Culliss | |
| 6,539,377 | B1 | 3/2003 | Culliss | |
| 6,816,850 | B2 | 11/2004 | Culliss | |
| 8,122,016 | B1 * | 2/2012 | Lamba et al. | 707/723 |
| 8,156,135 | B2 * | 4/2012 | Chi et al. | 707/765 |
| 8,190,604 | B2 * | 5/2012 | Wen et al. | 707/732 |
| 2006/0064411 | A1 * | 3/2006 | Gross et al. | 707/3 |
| 2006/0074902 | A1 * | 4/2006 | Anderson et al. | 707/5 |
| 2006/0136403 | A1 * | 6/2006 | Koo | 707/3 |
| 2008/0243821 | A1 * | 10/2008 | Delli Santi et al. | 707/5 |
| 2009/0070323 | A1 * | 3/2009 | Parikh et al. | 707/5 |
| 2009/0077047 | A1 * | 3/2009 | Cooper et al. | 707/4 |
| 2009/0327267 | A1 * | 12/2009 | Wong et al. | 707/5 |
| 2010/0106703 | A1 * | 4/2010 | Cramer | 707/706 |
| 2010/0205180 | A1 * | 8/2010 | Cooper et al. | 707/740 |
| 2010/0205202 | A1 * | 8/2010 | Yang et al. | 707/767 |
| 2011/0029541 | A1 * | 2/2011 | Schulman | 707/748 |
| 2011/0035397 | A1 * | 2/2011 | Joshi et al. | 707/759 |
| 2011/0035403 | A1 * | 2/2011 | Ismalon | 707/769 |
| 2011/0184981 | A1 * | 7/2011 | Lu et al. | 707/774 |
| 2011/0202533 | A1 * | 8/2011 | Wang et al. | 707/738 |
| 2011/0295847 | A1 * | 12/2011 | Cucerzan et al. | 707/723 |
| 2011/0320440 | A1 * | 12/2011 | McDonald et al. | 707/723 |
| 2012/0096030 | A1 * | 4/2012 | Kim | 707/775 |

OTHER PUBLICATIONS

Jansen et al., "An Analysis of Web Documents Retrieved and Viewed," School of Information Sciences and Technology, The Pennsylvania State University, the 4th International Conference on Internet Computing, Las Vegas, Nevada, pp. 65-69, Jun. 23-26, 2003, 5 pages.

(Continued)

*Primary Examiner* — Mohammed R Uddin
(74) *Attorney, Agent, or Firm* — Fish & Richardson P.C.

(57) ABSTRACT

Methods, systems and program products for identifying user intent from query patterns including, in one implementation, a method including identifying a current query including a query term, and obtaining search results responsive to the current query. Each search result identifying a document associated with a score indicating relevance. The method includes associating an intent with the session based on submission of a query containing a refining term, where each refining term was previously submitted with different unique queries. The method includes identifying prior sessions, where each prior session includes a query that matches the current query, and each prior session includes a query that contains the refining term. The method includes identifying a document selected more frequently in the prior sessions than by a general population and modifying the scores of the document in the search results. The method also includes ranking the search results based on the scores.

21 Claims, 8 Drawing Sheets

(56) References Cited

OTHER PUBLICATIONS

Joachims, "Evaluating Search Engines Using Clickthrough Data," Cornell University, Department of Computer Science, Draft, Feb. 19, 2002, 13 pages.

Joachims, "Optimizing Search Engines Using Clickthrough Data," 2002; Proceedings of the ACM SIGKDD International Conference on Knowledge Discovery and Data Mining, 10 pages.

* cited by examiner

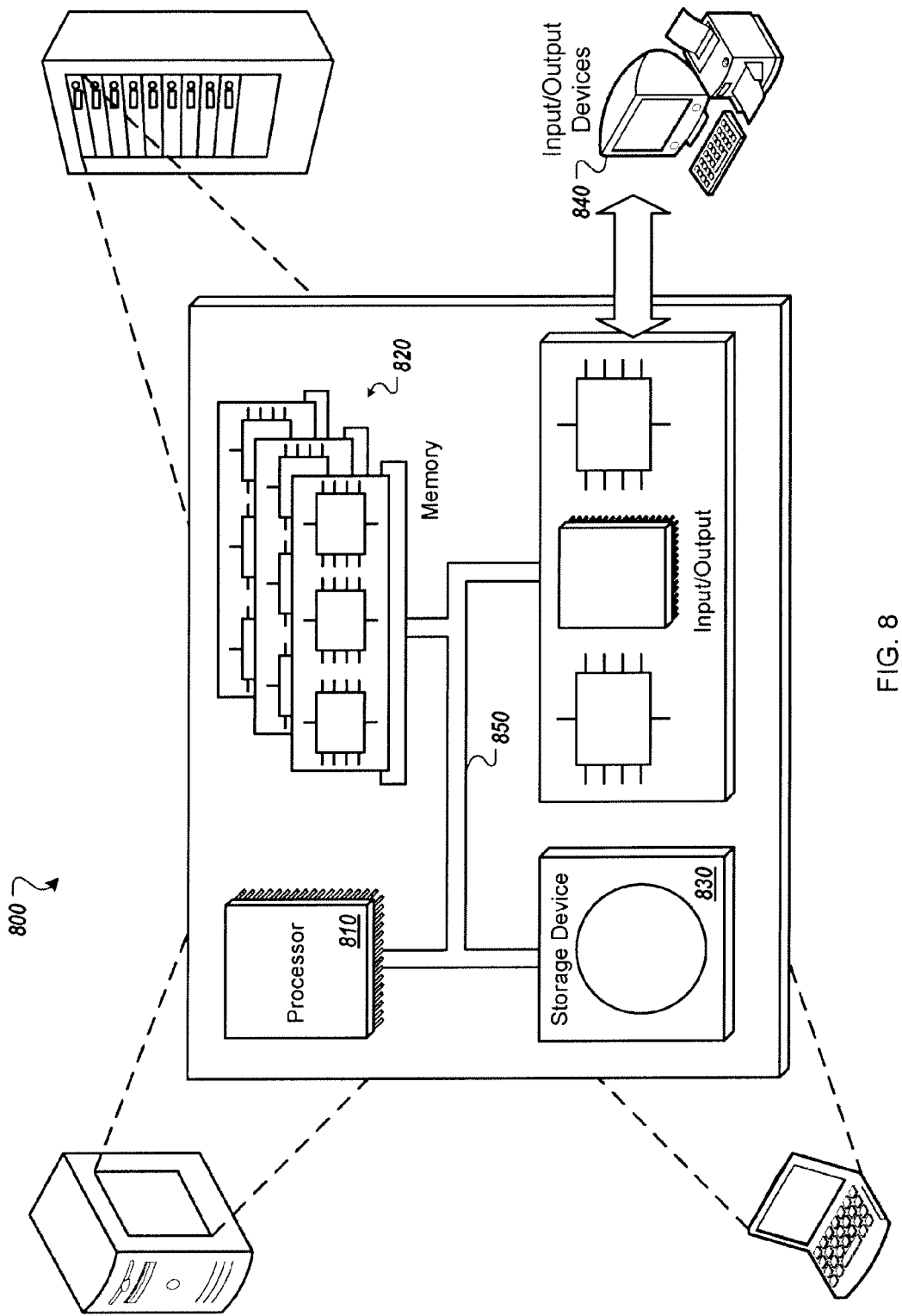

DETERMINING USER INTENT FROM QUERY PATTERNS

BACKGROUND

The present disclosure relates to using queries provided by one or multiple users to identify the intent of the user or users.

Internet search engines aim to identify documents or other items that are relevant to a user's needs and to present the documents or items in a manner that is most useful to the user. Such activity often involves a fair amount of mind-reading—inferring from various clues what the user wants. Certain clues may be user specific. For example, knowledge that a user is making a request from a mobile device, and knowledge of the location of the device, can result in much better search results for such a user.

Clues about a user's needs may also be more general. For example, search results can have an elevated importance, or inferred relevance, if a number of other search results link to them. If the linking results are themselves highly relevant, then the linked-to results may have a particularly high relevance. Such an approach to determining relevance may be premised on the assumption that, if authors of web pages felt that another web site was relevant enough to be linked to, then web searchers would also find the site to be particularly relevant. In short, the web authors "vote up" the relevance of the sites.

Other various inputs may be used instead of, or in addition to, such techniques for determining and ranking search results. For example, user reactions to particular search results or search result lists may be gauged, so that results on which users often click will receive a higher ranking. The general assumption under such an approach is that searching users are often the best judges of relevance, so that if they select a particular search result, it is likely to be relevant, or at least more relevant than the presented alternatives.

SUMMARY

This disclosure describes systems, methods, and apparatus including computer program products for determining user intent. In general, one or more aspects of the subject matter described in this specification can be embodied in one or more methods for processing query information. The methods include identifying a current query submission in a session, the current query including at least one query term, and obtaining a plurality of search results responsive to the current query, each search result identifying a document that is associated with a score indicating a relevance of the document to the current query; associating a first intent with the session based on submission of a first query in the session that contains a first refining query term from a plurality of refining query terms, wherein each refining query term was previously submitted with a plurality of different unique queries; identifying a first plurality of prior sessions, where each prior session includes a first submitted query that matches the current query, and where each prior session includes a first prior query that contains the first refining query term; modifying the respective score of a document in the plurality of search results in response to identifying the document is selected at a different frequency in the first plurality of prior sessions than by a general population; and ranking the plurality of search results based on the respective scores, including the modified respective score, of the documents.

These and other embodiments can optionally include one or more of the following features. The first query may be the current query. The method may include associating a second intent with the session based on submission of a second query in the session that contains a second refining query term wherein the second refining query term was previously submitted with a second plurality of different unique queries. The second query may be the current query. The method may include identifying a second plurality of prior sessions, where each prior session includes a second submitted query that matches the current query, and where each prior session includes a second prior query that contains the second refining query term; modifying the respective score of a document in the plurality of search results in response to identifying the document is selected at a different frequency in the second plurality of prior sessions than by a general population. A document may be identified in the first plurality of prior sessions and the document may be identified in the second plurality of prior sessions. Modifying the respective score of the document may include determining a first confidence value associated with the first plurality of prior sessions; determining a second confidence value associated with the second plurality of prior sessions; and modifying the respective score of the document based on the first confidence value and the second confidence value. The method may include identifying a plurality of refinements in a plurality of third search sessions, each refinement identified from a series of queries in which a refinement is applied; identifying the plurality of refining query terms from the plurality of refinements, the identifying comprising: for each of the plurality of refinements identifying a count of unique queries to which the refinement is applied and; determining the plurality of refining query terms based on the counts. Determining the plurality of refining query terms based on the counts may include determining that the count for each refining query term exceed a threshold. The threshold may be based a distribution of counts for the refinements. Identifying the document is selected at a different frequency in the second plurality of prior sessions than by a general population may include determining that the frequency of selection in the first plurality of prior sessions differs from the frequency of selection in the general population by a threshold. The threshold may be based on a standard deviation. The threshold may be based on a multiplier.

The details of one or more implementations are set forth in the accompanying drawings and the description below. Other features, aspects, and advantages will become apparent from the description, the drawings, and the claims.

DESCRIPTION OF THE DRAWINGS

FIG. 8 is a schematic diagram of an example computer system.

Like reference numbers and designations in the various drawings indicate like elements.

DETAILED DESCRIPTION

Figure 1:
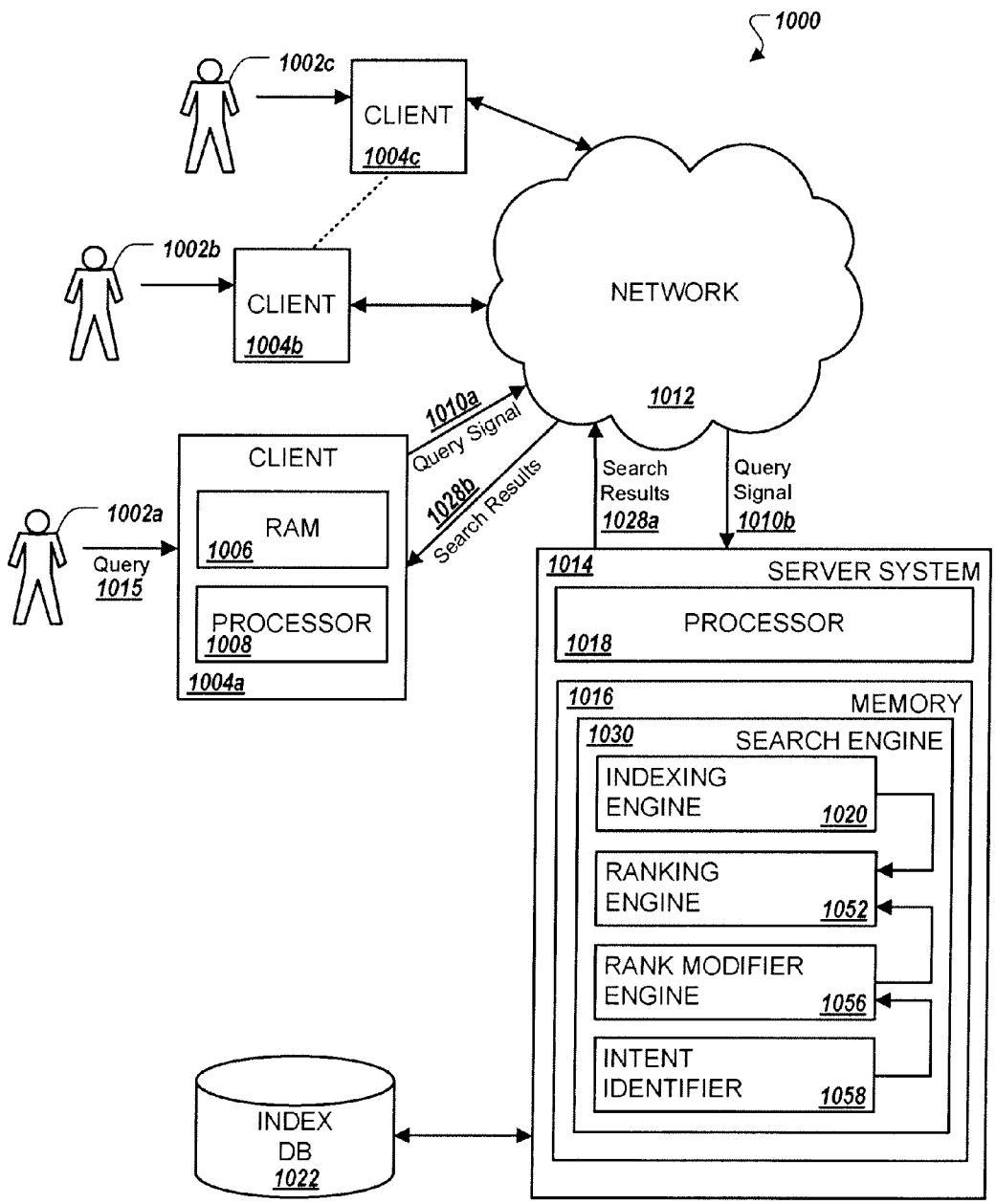
FIG. 1 shows an example information retrieval system for improving the relevance of results obtained from submitting search queries.

FIG. 1 shows an example information retrieval system for improving the relevance of results obtained from submitting search queries. The example system 1000 as can be implemented in an internet, intranet, or other client/server environment. The system 1000 is an example of an information retrieval system in which the systems, components and techniques described below can be implemented. Although several components are illustrated, there may be fewer or more components in the system 1000. Moreover, the components can be distributed on one or more computing devices connected by one or more networks or other suitable communication mediums.

A user 1002 (1002a, 1002b, 1002c) can interact with the system 1000 through a client device 1004 (1004a, 1004b, 1004c) or other device. For example, the client device 1004a can be a computer terminal within a local area network (LAN) or wide area network (WAN). The client device 1004a can include a random access memory (RAM) 1006 (or other memory and/or a storage device) and a processor 1008. The processor 1008 is structured to process instructions within the system 1000. In some implementations, the processor 1008 is a single-threaded processor. In other implementations, the processor 1008 is a multi-threaded processor. The processor 1008 can include multiple processing cores and is structured to process instructions stored in the RAM 1006 (or other memory and/or a storage device included with the client device 1004) to display graphical information for a user interface.

A user 1002a can connect to a search engine 1030 within a server system 1014 to submit a query 1015. When the user 1002a submits the query 1015 through an input device attached to a client device 1004a, a client-side query signal 1010a is sent into a network 1012 and is forwarded to the server system 1014 as a server-side query signal 1010b. Server system 1014 can be one or more server devices in one or more locations. The server system 1014 includes a memory device 1016, which can include the search engine 1030 loaded therein. A processor 1018 is structured to process instructions within the system 1014. These instructions can implement one or more components of the search engine 1030. The processor 1018 can be a single-threaded processor or a multi-threaded processor, and can include multiple processing cores. The processor 1018 can process instructions stored in the memory 1016 related to the search engine 1030 and can send information to the client device 1004a, through the network 1012, to create a graphical presentation in a user interface of the client device 1004a (e.g., a search results web page displayed in a web browser).

The server-side query signal 1010b is received by the search engine 1030. The search engine 1030 uses the information within the user query 1015 (e.g. query terms) to find relevant documents. The search engine 1030 can include an indexing engine 1020 that actively searches a corpus (e.g., web pages on the Internet) to index the documents found in that corpus, and the index information for the documents in the corpus can be stored in an index database 1022. This index database 1022 can be accessed to identify documents related to the user query 1015. Note that, an electronic document (which for brevity will simply be referred to as a document) does not necessarily correspond to a file. A document can be stored in a portion of a file that holds other documents, in a single file dedicated to the document in question, or in multiple coordinated files.

The search engine 1030 can include a ranking engine 1052 to rank the documents related to the user query 1015. The ranking of the documents can be performed using traditional techniques for determining an information retrieval (IR) score for indexed documents in view of a given query. The relevance of a particular document with respect to a particular search term or to other provided information may be determined by any appropriate technique. For example, the general level of back-links to a document that contains matches for a search term may be used to infer a document's relevance. In particular, if a document is linked to (e.g., is the target of a hyperlink) by many other relevant documents (e.g., documents that also contain matches for the search terms), it can be inferred that the target document is particularly relevant. This inference can be made because the authors of the pointing documents presumably point, for the most part, to other documents that are relevant to their audience.

If the pointing documents are in turn the targets of links from other relevant documents, they can be considered more relevant, and the first document can be considered particularly relevant because it is the target of relevant (or even highly relevant) documents. Such a technique may be the determinant of a document's relevance or one of multiple determinants. The technique is exemplified in some systems that treat a link from one web page to another as an indication of quality for the latter page, so that the page with the most such quality indicators is rated higher than others. Appropriate techniques can also be used to identify and eliminate attempts to cast false votes so as to artificially drive up the relevance of a page.

To further improve such traditional document ranking techniques, the ranking engine 1052 can receive an additional signal from a rank modifier engine 1056 to assist in determining an appropriate ranking for the documents. The rank modifier engine 1056 provides one or more prior models, or one or more measures of relevance for the documents based on one or more prior models, which can be used by the ranking engine 1052 to improve the search results' ranking provided to the user 1002. In general, a prior model represents a background probability of document result selection given the values of multiple selected features, as described further below. The rank modifier engine 1056 can perform one or more of the operations described below to generate the one or more prior models, or the one or more measures of relevance based on one or more prior models.

Various type of information may be provided to the rank modifier engine 1056 for improving the ranking of documents. For example, an underlying intent of a search requestor may be identified and used to adjust ranking of search results. To determine such underlying intents of a search requestor, the search engine 1030 can include an intent identifier 1058 that may implement one or more intent identification techniques. For example, the intent may be gleaned from adjustments provided by the search requestor. After an initial search request is executed and corresponding results provided, the search may be refined by the search requestor to steer the subsequent search towards desired results. For example, adding or removing particular search terms and phrases during a search session may provide clues to the intent of the user 1002a (regarding the search). Similarly, the manner in which an individual interacts with search results (e.g., search selections, time spent interacting with search selections, etc.) may enable the intent identifier 1058 to identify user intent. Additional information may also be used in conjunction with the refinement information for identifying user intent. For example, the language of the user (e.g., English, Spanish, etc.), the location of the user (e.g., country, region, state, city, etc.) and similar information may be utilized. Once identified, data representing the identified intent may be cataloged in a database (e.g., the index db 1022). Further, the identified user intent may be used for various applications such as providing assistance during future search sessions performed by the user 1002a or other users. Search result scoring and ranking (e.g., as performed by the ranking engine 1020 or the rank modifier engine 1056) can be adjusted to account for intent of the user 1002a or similar users.

The search engine 1030 can forward the final, ranked result list within a server-side search results signal 1028a through the network 1012. Exiting the network 1012, a client-side search results signal 1028b can be received by the client device 1004a where the results can be stored within the RAM 1006 and/or used by the processor 1008 to display the results on an output device for the user 1002a.

Figure 2:
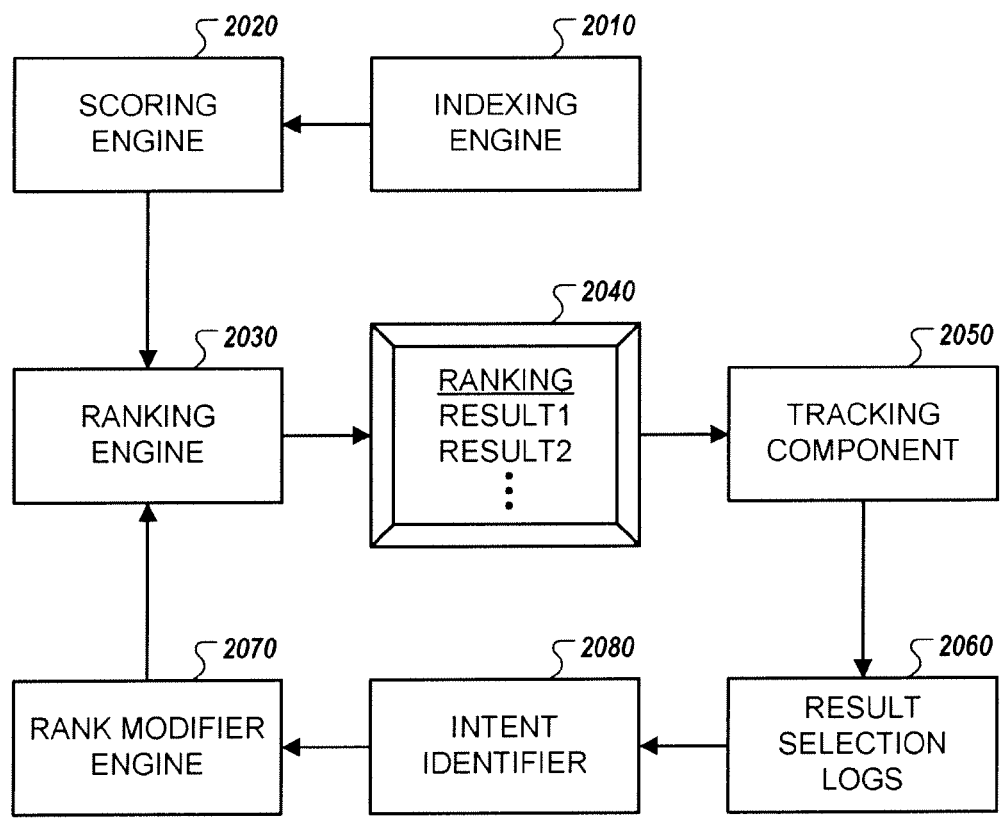
FIG. 2 shows example components of an information retrieval system.

FIG. 2 shows example components of an information retrieval system. These components can include an indexing engine 2010, a scoring engine 2020, a ranking engine 2030, a rank modifier engine 2070, and an intent identifier 2080. The indexing engine 2010 can function as described above for the indexing engine 1020. In addition, the scoring engine 2020 can generate scores for document results based on many different features, including content-based features that link a query to document results, and query-independent features that generally indicate the quality of document results. The content-based features can include aspects of document format, such as query matches to title or anchor text in an HTML (Hyper Text Markup Language) page. The query-independent features can include aspects of document cross-referencing, such as a rank of the document or the domain. Moreover, the particular functions used by the scoring engine 2020 can be tuned, to adjust the various feature contributions to the final IR score, using automatic or semi-automatic processes.

The ranking engine 2030 can produce a ranking of document results 2040 for display to a user based on IR scores received from the scoring engine 2020 and one or more signals from the rank modifier engine 2070. The rank modifier engine 2070 can adjust rankings at least in part based on data received from the intent identifier 2080. Along with being provided data from the result selection logs 2060, other sources may provide information to the intent identifier 2080. For example, queries entered into a user interface may be provided to the intent identifier 2080. In this particular example, the intent identifier 2080 provides information to the rank modifier engine 2070, however other architectures may be implemented. For example, intent information may be provided by the intent identifier 2080 to the indexing engine 2010 or one or more other components of the information retrieval system. A tracking component 2050 can be used to record information regarding individual user selections of the results presented in the ranking 2040. For example, the tracking component 2050 can be embedded JavaScript code included in a web page ranking 2040 that identifies user selections (clicks) of individual document results and also identifies when the user returns to the results page, thus indicating the amount of time the user spent viewing the selected document result. In other implementations, the tracking component 2050 can be a proxy system through which user selections of the document results are routed, or the tracking component can include pre-installed software at the client (e.g., a toolbar plug-in to the client's operating system). Other implementations are also possible, such as by using a feature of a web browser that allows a tag/directive to be included in a page, which requests the browser to connect back to the server with message(s) regarding link(s) clicked by the user.

The recorded information can be stored in result selection log(s) 2060. The recorded information can include log entries that indicate, for each user selection, the query (Q), the document (D), the time (T) on the document, the language (L) employed by the user, and the country (C) where the user is likely located (e.g., based on the server used to access the IR system). Other information can also be recorded regarding user interactions with a presented ranking, including negative information, such as the fact that a document result was presented to a user, but was not clicked, position(s) of click(s) in the user interface, IR scores of clicked results, IR scores of all results shown before the clicked result, the titles and snippets shown to the user before the clicked result, the user's cookie, cookie age, IP (Internet Protocol) address, user agent of the browser, etc. Still further information can be recorded, such as described below during discussion of the various features that can be used to build a prior model. Moreover, similar information (e.g., IR scores, position, etc.) can be recorded for an entire session, or multiple sessions of a user, including potentially recording such information for every click that occurs both before and after a current click.

The information stored in the result selection log(s) 2060 can be used by one or more components of the information retrieval system. For example, information could be provided to the intent identifier 2080 and the rank modifier engine 2070 in generating the one or more signals to the ranking engine 2030. In general, a wide range of information can be collected and used to modify or tune the click signal from the user to make the signal, and the future search results provided, a better fit for the user's needs. Thus, user interactions with the rankings presented to the users of the information retrieval system can be used to improve future rankings. Additionally, query adjustments indicative of refining a search can be used to modify rankings. In some arrangements, the user interaction and user intent data may be provided to one or more server systems (e.g., server system 1014) for use and storage (e.g., database 1022) for later retrieval.

The components shown in FIG. 2 can be combined in various manners and implemented in various system configurations. For example, the scoring engine 2020 and the ranking engine 2030 can be merged into a single ranking engine, such as the ranking engine 1052 of FIG. 1. The intent identifier 2080, the rank modifier engine 2070 and the ranking engine 2030 can also be merged, and in general, a ranking engine includes any software component that generates a ranking of document results after a query. Moreover, a ranking engine can be included in a client system in addition to (or rather than) in a server system.

Figure 3:
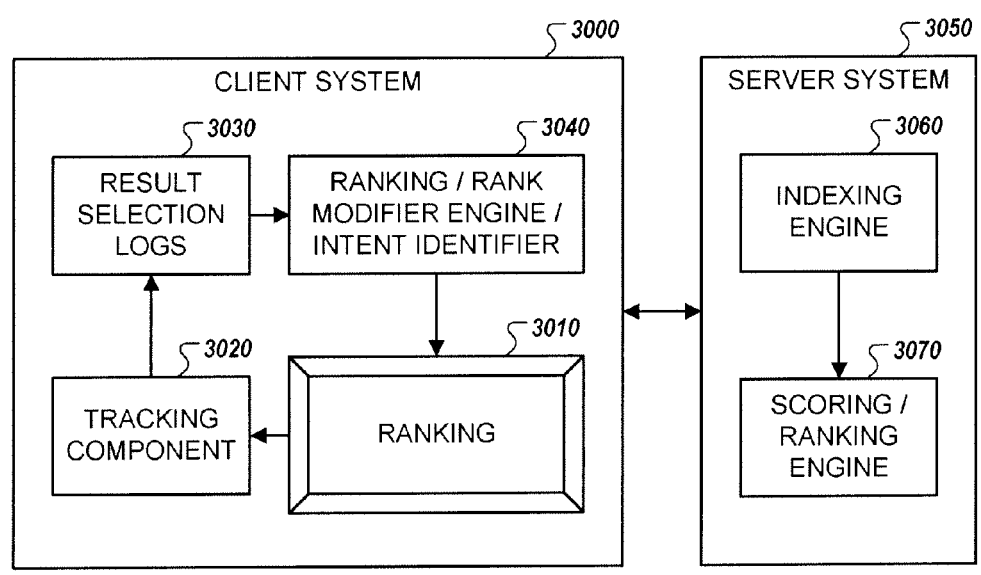
FIG. 3 shows another example information retrieval system and components.

FIG. 3 shows another example information retrieval system. In this system, a server system 3050 includes an indexing engine 3060 and a scoring/ranking engine 3070. A client system 3000 includes a user interface for presenting a ranking 3010, a tracking component 3020, result selection log(s) 3030 and a ranking/rank modifier engine/intent identifier 3040. For example, the client system 3000 can include a company's enterprise network and personal computers, in which a browser plug-in incorporates the ranking/rank modifier engine/intent identifier 3040. When an employee in the company initiates a search on the server system 3050, the scoring/ranking engine 3070 can return the search results along with either an initial ranking or the actual IR scores for the results. The browser plug-in can then re-rank the results locally based on tracked page selections for the company-specific user base. While FIGS. 2 and 3 provide two exemplary information retrieval systems, other architectures may be implemented. For example, an indent identifier may be positioned in other locations of an information retrieval system or distributed across multiple locations.

Figure 4A:
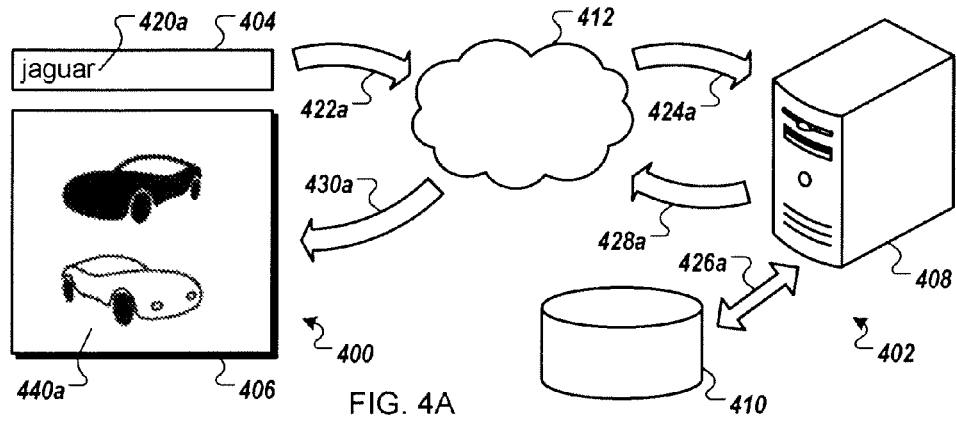
FIGS. 4A-C illustrate an information retrieval search session.
Figure 4B:
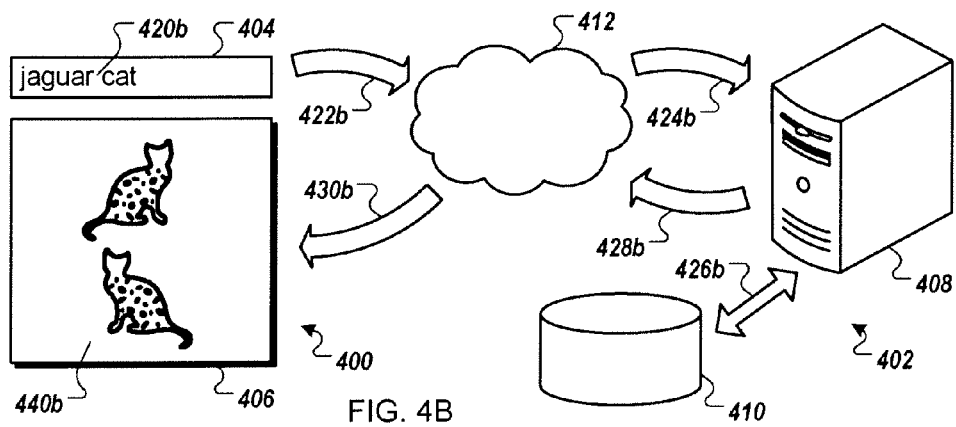
Figure 4C:
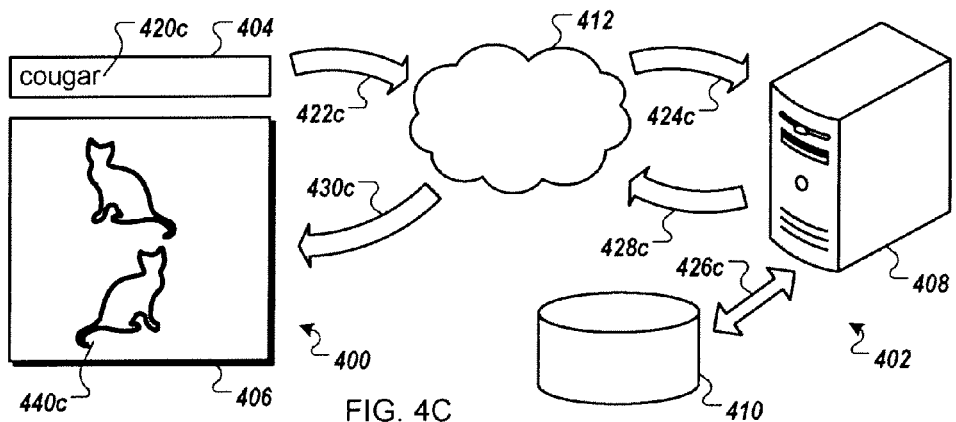

FIGS. 4A-C illustrate an information retrieval search session. Similar to the systems shown in FIGS. 1, 2 and 3, the information retrieval system shown in FIGS. 4A-C can provide relevant results for search queries. For example, similar to client device 1004 (shown in FIG. 1), a client side system 400 can enable a user to enter search queries and interact with search results. Also, similar to server system 1014 (also shown in FIG. 1), a server side system 402 can process search queries and can generate search results that are correspondingly provided to the client side system 400. To provide such functionality, the client side system 400 may include a query interface 404 (e.g., text entry field, type-ahead search control, selectable list, etc.) enabling a user to provide search queries. The client side system 400 can also include a results interface 406 that enables a user to view and interact with query results. Query result content may be provided in various types of representations, for example, such content may be provided in links (e.g., uniform resource locators (URLs)), text (e.g., relevant content portions, summaries, etc.), media (e.g., graphics, video, audio, etc.), individually or in combination. The results interface 406 can be provided by one or more output devices (e.g., video display, audio playback system, etc.) associated with the client side system 400. Various type of equipment may be included in the server side system 402 to access, process and store considerable amounts of content. For example, one or more servers (represented by a server 408) and one or more data stores (represented by data store 410) may be incorporated into the server side system 402. One or more communication techniques may be implemented for exchanging data among the client side system 400, the server side system 402 and other data sources (not shown). For example, networking techniques may be used to provide communication through a network 412 (e.g., the Internet) such as wired or wireless (or a combination of wired and wireless) connections.

To search for desired content (e.g., documents, video, audio, etc.) a user typically provides information that represents a query to the client side system 400. For example, a search session can be established in which multiple user queries are entered over a period of time (e.g., ten minutes, thirty minutes, an hour, two hours, etc.). Additionally, a query session may also include user interactions (e.g., clicks, view time, etc.) with search results based on the entered query. For example, upon entering a query and receiving a set of query results (e.g., links), the user may interact with the results by clicking one or more links based on associated information (e.g., text descriptions, media, etc.). Click data, which may be represented by actions such as selecting a link, visiting a resource (e.g., a web page) associated with a selected link for an amount of time (e.g., five seconds, one minute, five minutes, etc.), or other type of user interaction that may be collected during a search session. Lack of user interactions can be collected and stored, for example, proceeding to another set of search results without selecting a link. To store the collected information, one or more techniques may be implemented, for example, a web browser cookie that represents the collected information (or a portion of the information) may be maintained by the client system 400 or the information may be stored on the server side system 402, for example, using a user session.

Along with collecting user interactions (or lack of interactions) detected during a search session, other information may be collected. For example, information may be collected that represents one or more underlying intents of the user during a search session. By identifying the particular intent of a user or an intent commonly shared among multiple users, this information could be used to assist subsequent searches (during the same search session) or future search sessions. For example, if a particular user tends to consistently submit search requests such that pictures (or other type of visual data) are provided with the search results, the information retrieval system may store information regarding this user's proclivity for visual aides. Along with associating such an intent with one particular search requestor, the information retrieval system may associate the intent with similar users. For example, a group of users that share a similar characteristic (e.g., individuals that have reading difficulties) may each be associated with the intent of viewing search result pictures.

One or more techniques and methodologies may be implemented to identify intents of search requestors. For example, the manner in which a user refines search queries during a search session (e.g., by adjusting search terms) may provide an indication of the user's intent. To refine a search, search terms may be added or removed over a series of queries. Search refinements may also be indicated by other types of user interactions. For example, interactions with query search results (e.g., click data) may be collected and used to identify user intent to develop a user profile or for other applications.

Referring to FIG. 4A, initiating a search session is illustrated by a query being provided by a user. In this example, a search session is initiated by a search query 420a (e.g., "jaguar") being entered via the query interface 404. As shown by process arrows 422a and 424a, the search query 420a and characteristics associated with the user (e.g., language, location, etc.) may be sent to the server side system 402 via the network 412. The server side system 402 can process the search query 420a and related information, for example by using one or more software modules (e.g., a search engine) executed by the server 408. As shown by process arrow 426a, data (e.g., index information, user characteristics, search session statistics, etc.) may be retrieved from or stored in the data store 410 and can be used by the server 408 for providing a set of query results. Data store 410 is representative of various types of information sources that may be in communication with the server 408. For example, one or more storage devices (e.g., hard drives, etc.), servers, and computing device equipment may be directly or indirectly (e.g., via one or more networks) in communication with the server 408. As shown by process arrows 428a and 430a, search results may be sent to the client side system 400 via the network 412. Upon receipt, a set of search results 440a may be presented to a user via the results interface 406. For illustrative purposes, the search results 440a are shown as graphical representations; however, other representations (e.g., text, links, etc.) may be shown individually or in combination with the graphics.

In some instances, initial search results may not match the information desired by the user. For example, an ambiguous query may initially produce search results unrelated to a user's intent for the search. In this particular instance, the information retrieval system may consider the search query 420a (e.g., "jaguar") ambiguous, as the term "jaguar" may pertain to a type of automobile or to a member of the cat family, for example. As the information retrieval system may not recognize a user's query intent when presented with an ambiguous query, the system may present results unrelated to the intent. For example, the user may intend to receive information related to jaguar cats rather than automobiles, but may instead receive the search results 440a primarily related to automobiles.

Often to remedy ambiguous search results, the user may refine a search query such that received search results more closely reflect the user's search intent. For example, the user may provide one or more refining search terms to resolve ambiguities. In this example, as the results 440a (e.g., automobiles) may not relate to the user's desired search results, the user may adjust the initial search query 420a by adding one or more refining terms. The additional term(s) may be added to the beginning, end, the middle and/or other locations associated with the initial query. For example, as shown in FIG. 4B, the user may refine the search query 420a by entering (via the query interface 404) the additional term "cat" after the previously provided term "jaguar" to produce a refined search query 420b. As shown by process arrows 422b and 424b, the refined search query 420b and user characteristics may be provided to the server side system 402 via the network 412. Similar to the previous search term 420a, additional information (e.g., user characteristics, click data, etc.) may be provided with the refined research term 420b for assisting with the search operations of the server side system 402. Along with adding and removing terms from a query, other textual information may be used for identifying user intent. For example, particular word spellings and spelling patterns may be detected for intent identification. Such spellings may be based upon user nationality (e.g., using the spelling "colour" may indicate English nationality) or other user characteristic.

One or more techniques may be implemented to define an intent from detected query refinements. For example, the information retrieval system may track each occurrence of a refinement to produce a metric. Upon the metric reaching a predefined amount, the refinement may be considered to signify an intent. For example, the information retrieval system may detect each instance that a refinement is used in a unique query. With regard to the figure, the search term "cat" is added to the query to indicate that the user is interested in a type of feline (rather than a Jaguar automobile). In another unique query refinement, the user may add the term "cat" to the search term "wildcat" to similarly indicate that the user is interested in another member of the feline family (and not a Buick "Wildcat" model automobile). In some arrangements, the information retrieval system detects each instance in which the term "cat" is added and increments a corresponding count. Once the count reaches a predefined amount, the system can associate the user with an interest in cats. Similarly, with such an occurrence, the system may identify the term "cat" as a refinement term that may signify the intent. Along with tracking the occurrence of refinements (e.g., each instance that a refinement is used with a unique query), other types of metrics may be produced and utilized. For example, the frequency that refinements occur (e.g., appear in unique queries) may define one or more metrics.

Generally such refinements may be detected over a sequence of queries. For example, after realizing that the first search query "jaguar" did not provide desired search results, the term "cat" is added to the next search query. In a similar manner, additional terms may be added to subsequent search queries to further refine a search (and provide a glimpse of the user's intent). Similar to adding terms, search terms may be removed over a sequence of two (or more) search queries for search refinement. To detect such refinements, the information retrieval system may review various amounts of searches performed during one or multiple sessions. For example, the system may review previously executed sessions of a particular time length (e.g., ten minutes, half hour, two hours, etc.) for detecting refinements. The system may also review search queries as being provided from a user (e.g., to the query interface 404). To identify particular types of intents, search refinements may be monitored during particular times (e.g., after 10 PM, on weekends, during the month of November, etc.). In some implementations, the particular times may be based upon particular events (e.g., directly following a sporting event) or other similar type of arrangement.

In some implementations, a correlation between a refinement specified in a previous query and a search result preference related to a subsequent search query may indicate whether the refinement indicates a user intent. For example, a search refinement (e.g., "cat") may be detected in a user search query, and the user may later provide another search query (e.g., "furniture"). User interaction data (e.g., click data) may be used to determine the user's preference for query search results related to the subsequent search query (e.g., "furniture"). A difference between the user's search results preferences and results preferences determined for general search requestors (e.g., requestors providing the search query "furniture" without having previously provided the search query "cat") may indicate an intent refinement. For example, as compared to general search requestors, the user may exhibit a higher preference for search results relating to cat furniture, indicating that "cat" may be an intent.

To illustrate refinement collecting in this example, as shown by process arrow 426b, upon receiving the refined search query 420b, the server side system 402 can compare the search refinement (e.g., the term "cat") with previously identified search refinements stored in a repository (e.g., in the data store 410). Previously identified search refinements may be provided by the search requestor or from other search requestors. If the search refinement has been used to refine a predefined number (e.g., a large number) of unique search queries, the term may be classified as a user intent and used for one or more applications such as producing a profile of the search session, the user, or the like. For example, if a user initially enters the query "jaguar cat" 402b without first submitting the query "jaguar" 420a the server side system 402 may nevertheless ascribe an interest in cats to the user.

In this example, based upon the refined search query 420b, the server side system 402 produces a set of search results based upon the additional search term. In particular, the information retrieval system may identify the search session as being related to cats, and may assign cat-related search results a higher rank during the session. For example, the information retrieval system can associate the intent (e.g., cat-related) with the search session or with the user, and one or more software modules associated with the information retrieval system (e.g., a search engine) can adjust search result scoring/ranking based upon the intent. As shown by process arrows 428b and 430b, refined search results may be sent to the client side system 400 via the network 412. Similar to the search results 440a, a set of search results 440b (e.g., related to jaguar cats) may be presented to the user via the results interface 406. For illustration, the search results 440a are presented in a graphical format; however, texts and other representations of information may be used in the presentation.

Upon identifying the intent (associated with the user), the intent can be applied to subsequent searches associated with the user. For example, regardless of inclusion of the search refinement (e.g., adding the term "cat"), subsequent query search results produced during the search session may be related to the intent. Referring to FIG. 4C, the user may enter a search query 420c via the search interface 404. Similar to the initial search query 420a, the search query 420c (i.e., "cougar") may be considered ambiguous as the term may pertain to a type of automobile, a member of the cat family, and other possible meanings. Since the information retrieval system has identified the user's intent as being related to cats, search results related to cats may be provided to the user (e.g., with a higher ranking). Similar to other provided search results, subsequent queries may be refined based on the results. The intent may be a factor in determining the refined search results. As shown by process arrows 422c and 424c, the search query 420c along with other information (e.g., user characteristics) may be sent to the server side system 402 via the network 412. As shown by process arrow 426c, the server side system 402 can locate search results related to the search query 420c (e.g., "cougar") and the user's search intent (e.g., cats). As shown by process arrows 428c and 430c, once collected and processed (e.g., scored, ranked, etc.) the search results may be sent to the client side system 400 via the network 412. Once received, the search results 440c (e.g., results related to cougar cats) may be presented to the user in one or more formats (e.g., using graphics, text, etc.) via the results interface 406 or other type of device capable of presenting the results.

Figure 5:
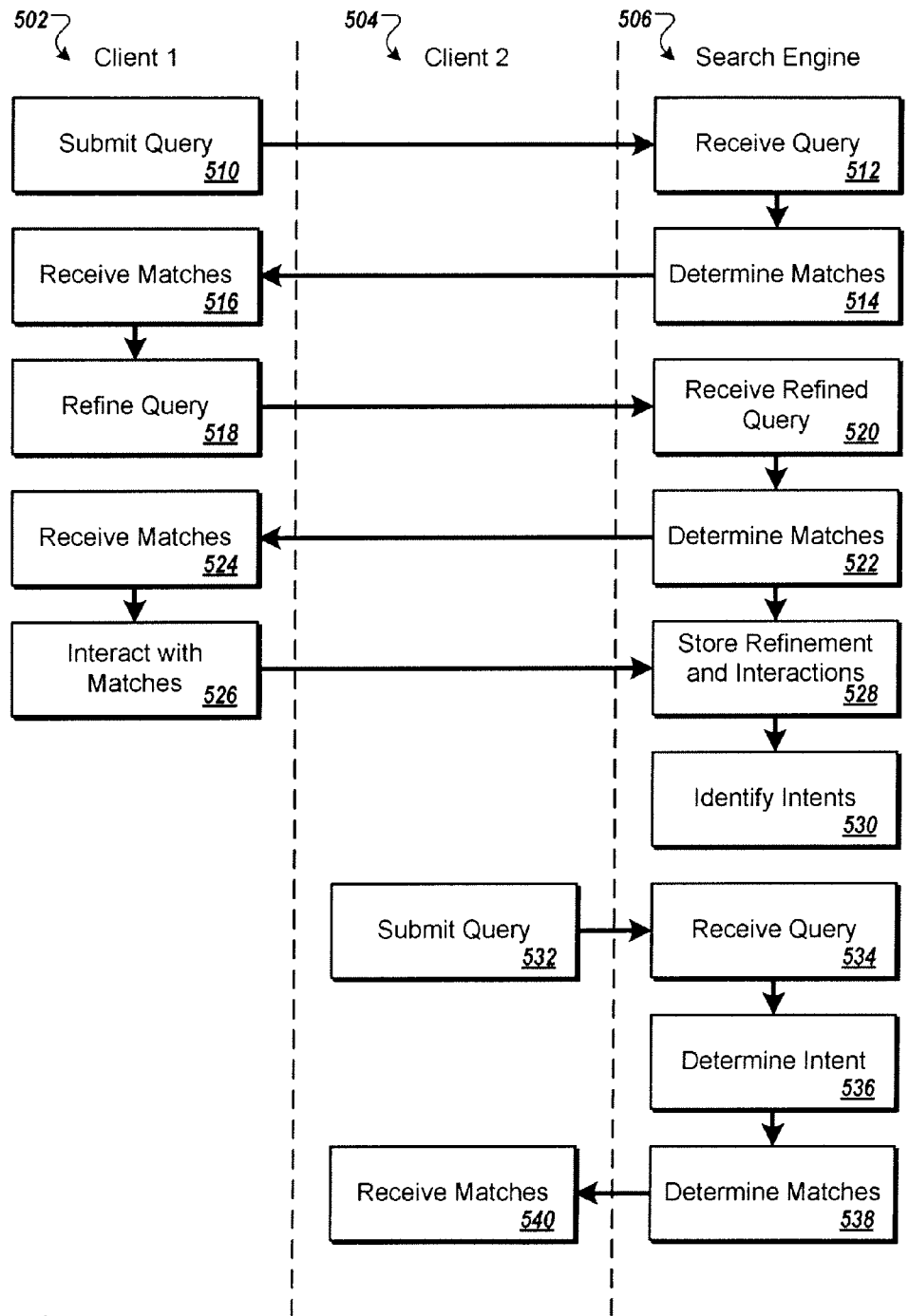
FIG. 5 shows a diagram illustrating the identification of user intent from search queries.

FIG. 5 shows a diagram illustrating the identification of user intent from search queries. A process diagram 500 represents interactions among multiple clients 502 and 504, and a search engine 506. For example, clients 502 and 504 may represent clients similar to clients 1004a-c (shown in FIG. 1). Similarly, search engine 506 may perform operations similar to operations of search engine 1030 (also shown in FIG. 1).

For purposes of illustration, search sessions of two clients are shown in process diagram 500, although any number of search sessions may be conducted by any number of clients. For example, search sessions may be conducted by more than two clients. As another example, a user may conduct an initial search session from a client and may conduct a subsequent search session from the same client or from a different client. Interactions among the search engine 506 and clients (e.g., clients 502, 504, etc.) may be handled concurrently. For example, the search engine 506 may perform operations (e.g., receiving search queries, determining matches (search results), determining refinements and intents, storing and retrieving data, etc.) related to a client while performing operations related to one or more other clients.

Exemplary operations of the client 502 include submitting 510 a query. For example, the query may be a search query for a particular recipe, such as "pizza recipe". The search query, for example, may be provided to the search engine 506. Exemplary operations of the search engine 506 include receiving 512 the query and determining 514 matches (e.g., search results). The matches may include a ranked listing of search results based on the search query provided by the client 502 and based on characteristics (e.g., location, language, etc.) of the client user. For example, the search engine 506 may determine that the client user can communicate using the English language (e.g., by cross-referencing supplied search terms with language dictionaries), and English language search matches may be provided to the client 502. As another example, the search engine 506 may determine that the client user is from the Chicago area (e.g., by examining a client's IP address), and search matches determined to be of particular relevance to a Chicago resident may be provided to the client 502.

Further operations of the client 502 may include receiving 516 matches. For example, the matches may include a set of links to various text-based pizza, sauce, and dough recipes. Upon interacting with the matches (e.g., clicking links, viewing pages, scrolling within pages, etc.), for example, the client user may determine that the received matches generally do not meet his or her search objectives. For example, the client user may want a pictorial representation of the steps or the end result of a recipe. Operations of the client 502 may include refining 518 the query. For example, to receive matches more closely related to his or her search objective (e.g., pictorial representations of pizza recipes), the client user may provide a query adjustment. In the present example, the client user may add refinement terms (e.g., "with pictures") to precede or follow the previously supplied search query (e.g., "pizza recipe").

Further operations of the search engine 506 may include receiving 520 a refined query. The search engine 506 may identify a query refinement based on a comparison with one or more previously received queries. For example, the search engine 506 may receive the search query "pizza recipe with pictures" and may identify the phrase "with pictures" as a refinement of the search query "pizza recipe". Operations of the search engine 506 include determining 522 matches related to the refined search query. For example, matches (e.g., search results) related to the refined search query (e.g., pizza recipes including pictures) can be determined and can be provided to the client 502.

Operations of the client 502 may include receiving 524 matches. For example, the matches may include a set of links to various pizza recipes with associated pictures. A client user may interact 526 with the matches (e.g., by navigating to websites, viewing information, scrolling through pages, etc.). Interaction data may provide information related to how closely provided matches relate to a user's search objectives. For example, dwelling on a website for an extended period of time (e.g., five minutes, ten minutes, a half hour, etc.) may indicate a high level of perceived relevance. As another example, dwelling on a website for a short period of time (e.g., two seconds, five seconds, etc.) and/or quickly scrolling through website content may indicate a low level of perceived relevance.

Operations of the search engine 506 may include storing 528 the refinement and interaction data. For example, the refinement "with pictures" may be stored in association with data related to client user interactions with the provided matches (e.g., search results). In some implementations, user characteristics data (e.g., language, location, etc.) may be stored in association with the refinement data and the interaction data. For example, profile data related to the user of client 502 (e.g., English language, Chicago location, etc.) may be stored by the search engine 506 in association with the search query (e.g., "pizza recipe"), the refinement (e.g., "with pictures") and related interaction data (e.g., click data) associated with the search results. In some implementations, characteristics shared by a search requestor and subsequent search requestors may be used to provide search results of a higher relevance to subsequent search requestors. For example, if it is determined that a particular search result is considered to be highly relevant to a number of search requestors (e.g., English language search requestors from Chicago perceiving deep-dish pizza recipes as being highly relevant to the search query "pizza recipe") then that search result may be assigned a higher search ranking by the search engine 506 for search requestors of a similar profile providing a similar search query.

Operations of the search engine 506 may include identifying 530 intents. Common refinements may be classified as intents. For example, if the refinement "with pictures" is determined to apply to a broad variety of search queries (e.g., "cellular telephone with pictures", "with pictures running shoes", "coffee with pictures machine", etc.) the refinement "with pictures" may be identified as an intent. In some implementations, a component of the search engine 506 may provide operations related to identifying and determining intent (e.g., the intent identifier 1058 shown in FIG. 1). An identified intent may be applied to subsequent search queries for the remainder of the search session. For example, once "with pictures" has been identified as a user intent, search results associated with pictures may be assigned a higher ranking by the search engine 306.

Exemplary operations of the client 504 include submitting 532 a query. For example, the query may be for images related to pizza, such as "with pictures pizza". The search query, for example, may be provided to the search engine 506. Exemplary operations of the search engine 506 include receiving 534 the query and determining 536 intent. For example, the phrase "with pictures" may have previously been identified as a query refinement that may be categorized as an intent related to a search session. After user intent has been determined (e.g., the intent to receive content including picture content), the search engine 506 may provide matches related to the intent for subsequent search queries, regardless of whether the refinement phrase (e.g., "with pictures") is provided by the client user.

In some implementations, the intent may also identify one or more characteristics shared among multiple search requestors. For example, similar to the user of client 502, a user of the client 504 may be determined to be familiar with the English language and may be determined to be from the Chicago area. As the user of the client 502 and the user of the client 504 may be determined to share characteristics (e.g., language, location), identified intents and relevant search results may be determined to be generally applicable to individuals within the group. For example, search results related to the search query "pizza" and the search intent "with pictures" that are determined to be of high relevance by members of a group (e.g., users from Chicago familiar with the English language) may be provided to search requestors with a similar profile. Based on determined intent, for example, client users with the previously described profile may regard English language websites featuring pictures of deep dish pizza to be most relevant to the provided search query.

Operations of the search engine 506 may include determining 538 matches (e.g., search results based on the received search query and the determined intent), and operations of the client 504 may include receiving 540 the matches. The client 504 user may interact with the matches and may provide interaction data (e.g., click data) and further search query refinements to the search engine 506.

Figure 6:
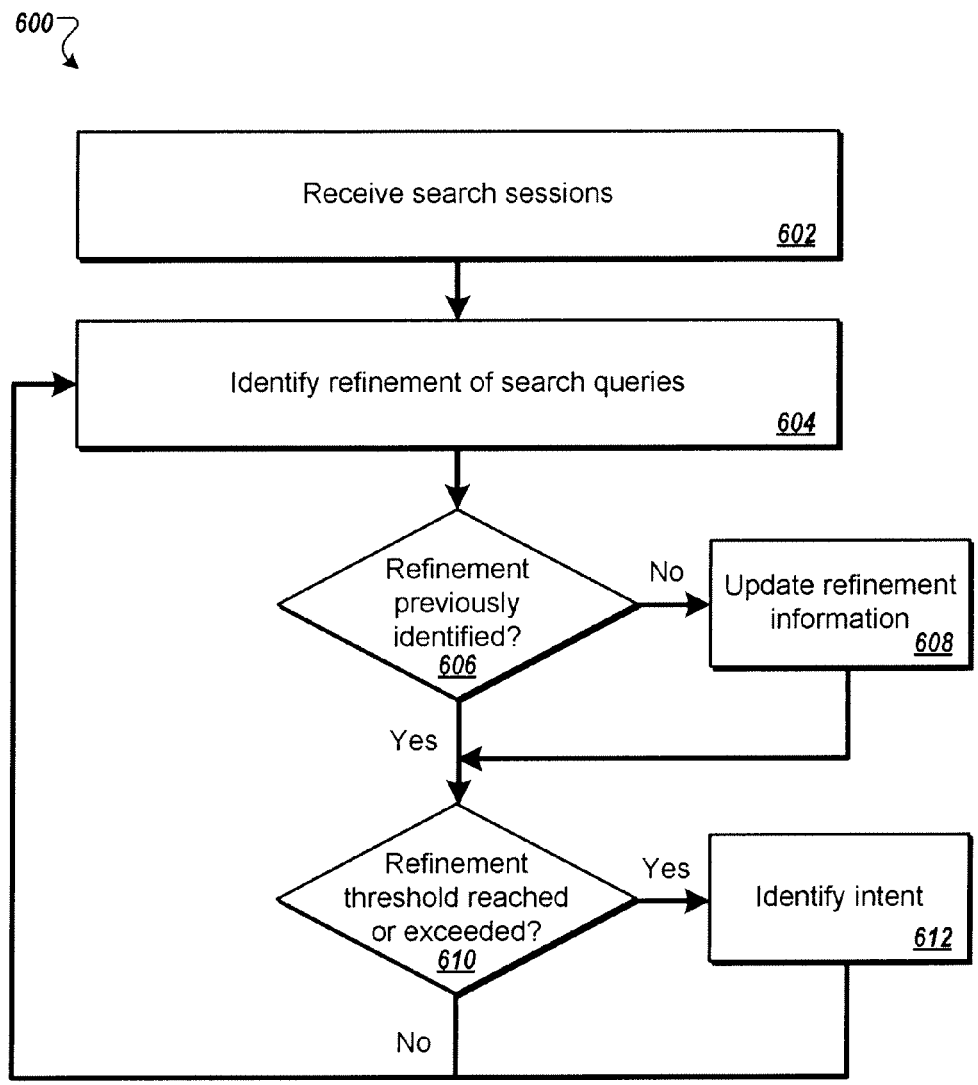
FIGS. 6 and 7 show flowcharts that represent operations of an intent identifier.
Figure 7:
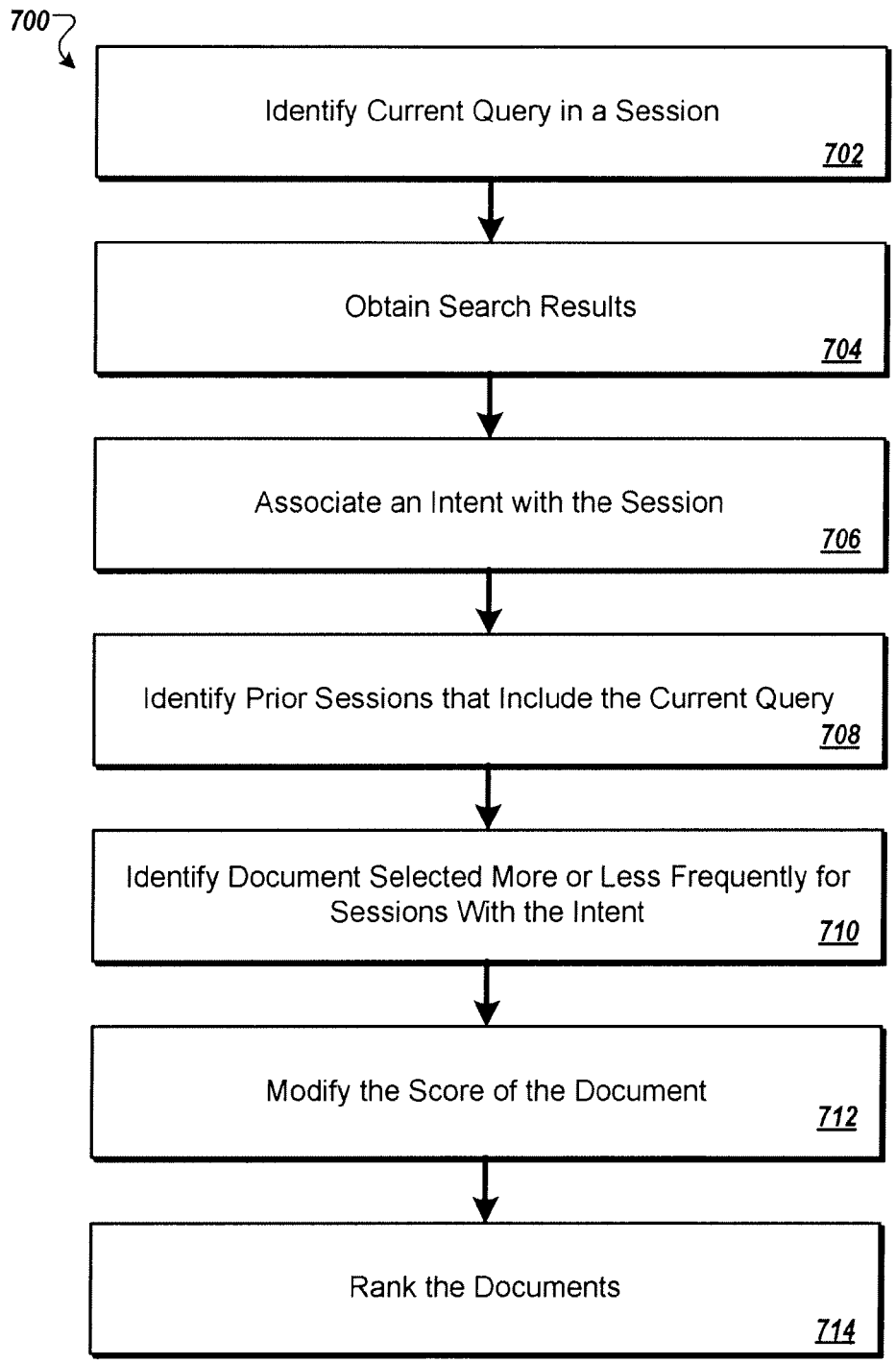

FIGS. 6 and 7 show flowcharts that represent operations of an intent identifier. Referring to FIG. 6, the flowchart 600 represents some operations of the search engine 1030 and the intent identifier 1058 (shown in FIG. 1). As mentioned above, search engine 1030 and intent identifier 1058 may be executed by one or more computing devices (e.g., servers).

One capability of the intent identifier 1058 is to process search query data provided by one or more client devices and to identify search terms as search refinements or search intents. To provide this functionality, the intent identifier 1058 may execute various operations. For example, operations of the intent identifier 1058 may include receiving 602 search sessions. Search sessions may include data related to search queries, user characteristics (e.g., language, location, etc.) and click data related to user interaction with provided search results. Upon receiving the search session data, operations may also include identifying 604 a refinement of one or more search queries. The refinement may be based on a search query adjustment provided by a client user. For example, the refinement may include one or more terms added to precede or to follow the search query, or may include one or more terms removed from the user query.

Upon identifying the search query refinement, operations may also include a determination 606 of whether the refinement had been previously identified. If the refinement had not previously been identified, operations may include an update 608 of refinement information. For example, refinement information (e.g., refinement terms, user characteristics, click data, etc.) may be added or modified in a data store. If the refinement had been previously identified, operations may include a determination 610 of whether a refinement threshold has been reached or exceeded. For example, a count may be maintained for tracking refinement instances. In some implementations, refinement instances may be tracked in relation to one or more user characteristics. For example, refinement instances may be tracked for users of different languages (e.g., a set of instances may be tracked for English language users, another set for Spanish language users, another set for German language users, etc.). As another example, refinement instances may be tracked for users from different locations (e.g., a set of instances may be tracked for users in the United States, another set for users in Canada, another set for users in Australia, etc.). If a refinement threshold has been reached or exceeded (e.g., a specified count, a prevalence, etc.), operations may include an identification 612 of an intent. For example, a determination may be made that the refinement term(s) appears in a large number of refinement search queries and/or that the term appears as a refinement in a broad array of different search queries.

FIG. 7 shows a flowchart that represents operations of an intent identifier. The example process 700 can be implemented in an information retrieval system, such as the intent identifier 2080 shown in FIG. 2, for example.

The process identifies a current query submission in a session (702). The current query includes at least one query term.

The process obtains search results responsive to the query (704). The search results may be obtained from a scoring engine. Each of the search results identifies a document associated with a score indicating the relevance.

The process associates an intent with the session (706). In one embodiment, the intent is associated with the session based on the submission of a query in the session that contains a refining query term. In some scenarios, a query term in the current query can identify an intent associated with the session. In some embodiments, multiple intents may be associated with a single session based on the submission of refining query terms as part of queries during the session. In some scenarios, multiple intents may be identified from a single query. For example, if a user submits the query "food pictures" then the session may be associated with both a "food" intent and a "pictures" intent.

In one embodiment, an intent is associated with the session if a query contains an intent refining query term. Refining query terms are determined by analyzing prior sessions to identify query refinements. A query refinement is a change to a query that a user makes in order to refine the query and obtain more accurate results. For example, a user may enter the query "Paris, France" and refine the query to say "Paris, France pictures". In this example the query term "pictures" is a refining query term.

Query refinements are then processed to determine which refining terms are used with a broad subsection of different queries. The broadly applied refining terms are deemed intent refining query terms. For example, the refinement "pictures" may have been applied to "Paris, France", "chicken recipe", "labradoodle", and many other unique queries. Therefore, in this example, "pictures" is an intent refining query term. In contrast, refinements that apply to only a small number of queries are not intent refining query terms. For example, the query "Chernobyl" may be refined to state "Chernobyl meltdown"; however, meltdown may only refine a relatively small number of unique queries, for example, "nuclear" and "toddler." Therefore, "meltdown" is not an intent refining query term. In some embodiments, determining a query refinement is an intent refining query term is based on the number of unique queries to which the term has been applied. The number of unique queries is compared to a threshold value, for example, one hundred unique queries. In another embodiment, the number of unique queries is plotted for each refining term. Using a distribution function, the more commonly used terms are identified as intent refining query terms. For example, in one scenario, only query terms with a number of unique queries greater than one standard deviation from the mean are deemed intent refining query terms.

The process identifies prior sessions that include the current query (708). The process analyzes historical sessions to identify sessions in which a query identical to the current query was submitted.

The process identifies documents selected more or less frequently for prior sessions associated with the intent. (710). Based on the prior sessions, the process identifies documents selected more or less frequently in prior sessions that are associated with the intent than in the prior sessions regardless of any associated intent (e.g., the general population of prior sessions).

The process modifies the scores of the document (712). Once a document is identified that occurs more frequently in prior sessions associated with an intent than for the general population of prior sessions, the score of the document may be increased. In some embodiments, the scores of documents which are selected less frequently in prior sessions associated with the intent than in the general population of prior sessions may have their scores decreased. In some scenarios, a score of a document may be influenced by multiple intents. For example, if the user submits the query "cat food" and, as a result, the session is associated with both "cat" and "food" then a document about "dog food" may be selected more frequently by sessions with a "food": intent and less frequently by sessions with a "cat" intent. In this scenario, the effects on the document score may be cumulative.

In some arrangements, the effect on the document score may be weighted based on a confidence value. The confidence value is a measure of certainty that the particular intent applies to the result. In some implementations, the confidence value can be based on a quantity of prior sessions associated with the intent which were associated with the increased or decreased frequency of selection. For example, if 200 sessions associated with a "cat" intent selected a "dog food" document less frequently than the general population and 3000 prior sessions with a "food" intent selected the "dog food" document more frequently than the general population, then the effect of the "cat" intent will be weighted less than the effect of the "food" intent reflecting the smaller quantity of sessions (e.g. 200 versus 3000). In some implementations, the effect of the intent on the score of the document may be calculated using the formula:

$$DocumentBoost = \frac{\sum_{i=1}^{n}(IntentBoost_i * Confidence_n)}{\sum_{i=1}^{n} Confidence_n}$$

Where DocumentBoost is the effect on the score based on the intents associated with the session; n is the number of intents associated with the session; $IntentBoost_i$ is a score adjustment based on the ith intent associated with the session; and $Confidence_i$ is the confidence value associated with the ith intent.

The process ranks the documents based on the modified scores (714).

FIG. 8 is a schematic diagram of an example computer system 800. The system 800 can be used for practicing operations described above. The system 800 can include a processor 810, a memory 820, a storage device 830, and input/output devices 840. Each of the components 810, 820, 830, and 840 are interconnected using a system bus 850. The processor 810 is capable of processing instructions within the system 800. These instructions can implement one or more aspects of the systems, components and techniques described above. In some implementations, the processor 810 is a single-threaded processor. In other implementations, the processor 810 is a multi-threaded processor. The processor 810 can include multiple processing cores and is capable of processing instructions stored in the memory 820 or on the storage device 830 to display graphical information for a user interface on the input/output device 840.

The memory 820 is a computer readable medium (volatile or non volatile) that stores information within the system 800. The memory 820 can store processes related to the functionality of the search engine 1030 (shown in FIG. 1), for example. The storage device 830 is capable of providing persistent storage for the system 800. The storage device 830 can include a floppy disk device, a hard disk device, an optical disk device, or a tape device, or other suitable persistent storage mediums. The storage device 830 can store the various databases described above. The input/output device 840 provides input/output operations for the system 800. The input/output device 840 can include a keyboard, a pointing device, and a display unit for displaying graphical user interfaces.

The computer system shown in FIG. 8 is but one example. In general, embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results. Moreover, the server environment, which is configured to provide electronic search service and employ the ranking systems and techniques described, need not be implemented using traditional back-end or middleware components. The server environment can be implemented using a program installed on a personal computing apparatus and used for electronic search of local files, or the server environment can be implemented using a search appliance installed in an enterprise network.

Other implicit user feedback models can be used in place of the traditional click fraction model described. For example, an implicit user feedback model employing a large-scale logistic regression model that uses the actual query and url as features can be used. The new prior models can be used to denormalize any query-specific click model.

In addition, the prior model(s) can be applied in varying manners. For example, a prior model can be applied at run time as an adjustment to the ranking boost given to a document in accordance with the implicit user feedback model since the set of features used for the prior model can be available for direct input at run time. Alternatively, the prior model can be applied at model building time, where features are fetched from the log(s), which can result in improved response time during searches. In addition, when the model is applied at building time, the implicit feedback can be adjusted per each click record before aggregating the feedback from multiple clicks into a signal. This adjustment can be for instance a weighting of the clicks according to how much they were affected by display bias before the clicks are aggregated.

At run time, the signal is typically only adjusted after the clicks were already aggregated, which can result in some loss of precision.

What is claimed is:

1. A computer-implemented method, comprising:
identifying a query submission in a session, the query including one or more query terms, and obtaining a plurality of search results responsive to the query, each search result identifying a respective document that is associated with a respective score indicating a relevance of the document to the query;
associating a plurality of intents with the session based on the one or more query terms including an intent refining query term, wherein the intent refining query term was previously submitted with a plurality of different queries a quantity of times that exceeds a threshold;
identifying one or more of the respective documents, wherein each of the identified documents was selected by users in a plurality of sessions associated with at least one of the intents with a higher or lower frequency than when the identified document was selected by users in a plurality of sessions not associated with the at least one intent;
for each of the identified documents:
identifying, for each of the plurality of intents, an intent boost that represents a score adjustment for the identified document based on the intent;
determining, for each of the plurality of intents, a confidence value that is based on a quantity of the plurality of sessions associated with the intent; and
modifying the respective score of the document based on a document boost factor, the document boost factor being based on a function of the intent boost for each of the plurality of intents and the confidence value for each of the plurality of intents; and
ranking the plurality of search results based on the respective scores, including the one or more modified respective scores.

2. The method of claim 1, comprising associating a different additional intent with the session based on the one or more query terms including a second intent refining query term, wherein the second intent refining query term was previously submitted with a plurality of different queries a second quantity of times that is beyond a second threshold.

3. The method of claim 2, comprising:
identifying one or more second documents of the respective documents, wherein each second document was selected by users in a plurality of sessions associated with the additional intent with a higher or lower frequency than when the second document was selected by users in a plurality of sessions not associated with the additional intent; and
for each of the second documents, modifying the respective score of the second document based on a second confidence value, wherein the second confidence value is based on a quantity of the plurality of sessions associated with the additional intent.

4. The method of claim 1, wherein modifying the respective score of the document comprises:
increasing the respective score if the document was selected by users in the plurality of sessions associated with the at least one intent with a higher frequency than when the document was selected by users in the plurality of sessions not associated with the at least one intent; and
decreasing the respective score if the document was selected by users in the plurality of sessions associated with the at least one intent with a lower frequency than when the document was selected by users in the plurality of sessions not associated with the at least one intent.

5. The method of claim 1, wherein the threshold is based on a distribution of a set of queries according to a respective quantity of times that each query in the set of queries was submitted in a plurality of sessions.

6. The method of claim 1, wherein each session is defined by a period of time.

7. The method of claim 5, wherein the threshold is based on a standard deviation.

8. A computer storage device encoded with a computer program, the program comprising instructions that when executed by data processing apparatus cause the data processing apparatus to perform operations comprising:
identifying a query submission in a session, the query including one or more query terms, and obtaining a plurality of search results responsive to the query, each search result identifying a respective document that is associated with a respective score indicating a relevance of the document to the query;
associating a plurality of intents with the session based on the one or more query terms including an intent refining query term, wherein the intent refining query term was previously submitted with a plurality of different queries a quantity of times that exceeds a threshold;
identifying one or more of the respective documents, wherein each of the identified documents was selected by users in a plurality of sessions associated with at least one of the intents with a higher or lower frequency than when the identified document was selected by users in a plurality of sessions not associated with the at least one intent;
for each of the identified documents:
identifying, for each of the plurality of intents, an intent boost that represents a score adjustment for the identified document based on the intent;
determining, for each of the plurality of intents, a confidence value that is based on a quantity of the plurality of sessions associated with the intent; and
modifying the respective score of the document based on a document boost factor, the document boost factor being based on a function of the intent boost for each of the plurality of intents and the confidence value for each of the plurality of intents; and
ranking the plurality of search results based on the respective scores, including the one or more modified respective scores.

9. The computer storage device of claim 8, wherein the operations further comprise associating a different additional intent with the session based on the one or more query terms including a second intent refining query term, wherein the second intent refining query term was previously submitted with a plurality of different queries a second quantity of times that is beyond a second threshold.

10. The computer storage device of claim 9, wherein the operations comprise:
identifying one or more second documents of the respective documents, wherein each second document was selected by users in a plurality of sessions associated with the second intent with a higher or lower frequency than when the second document was selected by users in a plurality of sessions not associated with the second intent; and
for each of the second documents, modifying the respective score of the second document based on a second confidence value, wherein the second confidence value is based on a quantity of the plurality of sessions associated with the second intent.

11. The computer storage device of claim 10, wherein modifying the respective score of the document comprises:
increasing the respective score if the document was selected by users in the plurality of sessions associated with the at least one intent with a higher frequency than when the document was selected by users in the plurality of sessions not associated with the at least one intent; and
decreasing the respective score if the document was selected by users in the plurality of sessions associated with the at least one intent with a lower frequency than when the document was selected by users in the plurality of sessions not associated with the at least one intent.

12. The computer storage device of claim 8, wherein the threshold is based a distribution of a set of queries according to a respective quantity of times that each query in the set of queries was submitted in a plurality of sessions.

13. The computer storage device of claim 8, wherein each session is defined by a period of time.

14. The computer storage device of claim 12, wherein the threshold is based on a standard deviation.

15. A system comprising:
one or more computers; and;
a computer-readable device coupled to the one or more computers having instructions stored thereon which, when executed by the one or more computers, cause the one or more computers to perform operations comprising:
identifying a query submission in a session, the query including one or more query terms, and obtaining a plurality of search results responsive to the query, each search result identifying a respective document that is associated with a respective score indicating a relevance of the document to the query;
associating a plurality of intents with the session based on the one or more query terms including an intent refining query term, wherein the intent refining query term was previously submitted with a plurality of different queries a quantity of times that exceeds a threshold;
identifying one or more of the respective documents, wherein each of the identified documents was selected by users in a plurality of sessions associated with at least one of the intents with a higher or lower frequency than when the identified document was selected by users in a plurality of sessions not associated with the at least one intent;
for each of the identified documents:
identifying, for each of the plurality of intents, an intent boost that represents a score adjustment for the identified document based on the intent;
determining, for each of the plurality of intents, a confidence value that is based on a quantity of the plurality of sessions associated with the intent; and
modifying the respective score of the document based on a document boost factor, the document boost factor being based on a function of the intent boost for each of the plurality of intents and the confidence value for each of the plurality of intents; and
ranking the plurality of search results based on the respective scores, including the one or more modified respective scores.

16. The system of claim 15, wherein the operations further comprise associating a different additional intent with the session based on the one or more query terms including a second intent refining query term, wherein the second intent refining query term was previously submitted with a plurality of different queries a second quantity of times that is beyond a second threshold.

17. The system of claim 16, wherein the operations further comprise:
identifying one or more second documents of the respective documents, wherein each second document was selected by users in a plurality of sessions associated with the additional intent with a higher or lower frequency than when the document was selected by users in a plurality of sessions not associated with the additional intent; and
for each of the second documents, modifying the respective score of the second document based on a second confidence value, wherein the second confidence value is based on a quantity of the plurality of sessions associated with the additional intent.

18. The system of claim 15, wherein modifying the respective score of the document comprises:
increasing the respective score if the document was selected by users in the plurality of sessions associated with the at least one intent with a higher frequency than when the document was selected by users in the plurality of sessions not associated with the at least one intent; and
decreasing the respective score if the document was selected by users in the plurality of sessions associated with the at least one intent with a lower frequency than when the document was selected by users in the plurality of sessions not associated with the at least one intent.

19. The system of claim 15, wherein the threshold is based a distribution of a set of queries according to a respective quantity of times that each query in the set of queries was submitted in a plurality of sessions.

20. The system of claim 15, wherein each session is defined by a period of time.

21. The system of claim 19, wherein the threshold is based on a standard deviation.

* * * * *